(12) United States Patent
Kikushima (10) Patent No.: US 7,248,803 B2
(45) Date of Patent: Jul. 24, 2007

(54) WAVELENGTH MULTIPLEX TRANSMISSION SYSTEMS

(75) Inventor: Koji Kikushima, Arai Ichikawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/541,162

(22) PCT Filed: Nov. 17, 2004

(86) PCT No.: PCT/JP2004/017080

§ 371 (c)(1),
(2), (4) Date: Jun. 30, 2005

(87) PCT Pub. No.: WO2005/050884

PCT Pub. Date: Jun. 2, 2005

(65) Prior Publication Data

US 2006/0115273 A1   Jun. 1, 2006

(30) Foreign Application Priority Data

Nov. 20, 2003   (JP) ............................... 2003-390742

(51) Int. Cl.
  *H04J 14/02*   (2006.01)
  *H04B 10/00*   (2006.01)
  *H04B 10/04*   (2006.01)
  *H04B 10/06*   (2006.01)

(52) U.S. Cl. ...................... 398/159; 398/161; 398/202; 398/194; 398/81

(58) Field of Classification Search .................. 398/74, 398/75, 81, 91, 141, 147, 152, 158, 159, 398/161, 205, 192–194

See application file for complete search history.

(56) References Cited

U.S. PATENT DOCUMENTS 5,257,124 A * 10/1993 Glaab et al. .................. 398/91

(Continued)

FOREIGN PATENT DOCUMENTS

EP   0 528 225 A3   2/1993

(Continued)

OTHER PUBLICATIONS

K. Kikushima et al., *Signal Crosstalk Due to Fiber Nonlinearity in Wavelength Multiplexed SCM-AM-TV Transmission Systems*, Optical Fiber Communication Conference (OFC 1995), Post-deadline paper, PD24, Feb.-Mar. 1995.

(Continued)

*Primary Examiner*—Dalzid Singh
(74) *Attorney, Agent, or Firm*—Workman Nydegger (57) ABSTRACT

A wavelength multiplex transmission system is provided to reduce crosstalk among wavelengths and reduce deterioration of signals. At a transmission apparatus, one input signal is differentially divided into two; each of the two is converted to an optical signal; and then they are wavelength-multiplexed and transmitted. When crosstalk is arisen in the wavelength multiplex transmission system, the crosstalk is superposed on the two optical signals. The crosstalk is equally superposed on each of the signals with inverted polarities. Accordingly, converting the optical signals to electrical signals and then differentially combining them at a receiving apparatus, their signal components are accumulated, while their crosstalk components are cancelled out. Thereby, in the wavelength multiplex transmission system, deterioration of optical signals due to crosstalk can be reduced.

7 Claims, 8 Drawing Sheets

U.S. PATENT DOCUMENTS

| | | | |
|---|---|---|---|
| 5,404,240 A * | 4/1995 | Nishio et al. ............... | 398/75 |
| 5,953,140 A | 9/1999 | McKiel, Jr. | |
| 6,433,904 B1 * | 8/2002 | Swanson et al. ............ | 398/91 |
| 7,072,592 B2 * | 7/2006 | Sarraf ....................... | 398/208 |
| 2002/0163684 A1 * | 11/2002 | Lu et al. .................... | 359/110 |
| 2006/0115273 A1 * | 6/2006 | Kikushima ................. | 398/85 |

FOREIGN PATENT DOCUMENTS

| | | |
|---|---|---|
| JP | 58-215836 | 12/1983 |
| JP | 05-206952 | 8/1993 |
| JP | 08-018536 | 1/1996 |

OTHER PUBLICATIONS

A. Li et al., *Experimental Confirmation of Crosstalk Due to Stimulated Raman Scattering in WDM AM-VSB CATV Transmission Systems*, Electronics Letters, vol. 31, No. 18, Aug. 31, 1995, pp. 1538-1539.

Noboru Takachio et al., *A Study on a 10-Gb/s, 8-channel WDM Transmission System Employing Unequal Wavelength Allocation*, The Institute of Electronics, Information and Communication Engineers, Technical Report of IEICE, CS96-43, Jun. 1996, pp. 19-24.

Keang-Po Ho et al., *Demultiplexer Crosstalk Rejection Requirements for Hybrid WDM System with Analog and Digital Channels*, IEEE Photonics Technology Letters, vol. 10, No. 5, May 1998, pp. 737-739.

Mary R. Phillips et al., *Crosstalk Due to Optical Fiber Nonlinearities in WDM CATV Lightwave Systems*, Journal of Lightwave Technology, vol. 17, No. 10, Oct. 1999, pp. 1782-1792.

Shibata et al., *Optical Image Distribution System Using an FM Batch Conversion Method*, Institute of electronics, Information and Communication Engineers, Technical Journal B, vol. J83-B, No. 7, Jul. 2000, pp. 948-959 (with partial translated).

F. Coppinger, et al., *Nonlinear Raman Crosstalk in a Video Overlay Passive Optical Network*, Optical Fiber Communication Conference (OFC 2003), TuR5, Mar. 2003, pp. 285-286.

ITU-T G. 983.3, *A Broadband Optical Access System with Increased Service Capability by Wavelength Allocation*, Mar. 2001.

* cited by examiner

WAVELENGTH MULTIPLEX TRANSMISSION SYSTEMS

TECHNICAL FIELD

The present invention relates to a wavelength multiplex transmission system used for transmission of a wavelength-multiplexed optical signal, and a transmission apparatus and a receiving apparatus to be applied to such wavelength multiplex transmission system.

BACKGROUND ART

Figure 1:
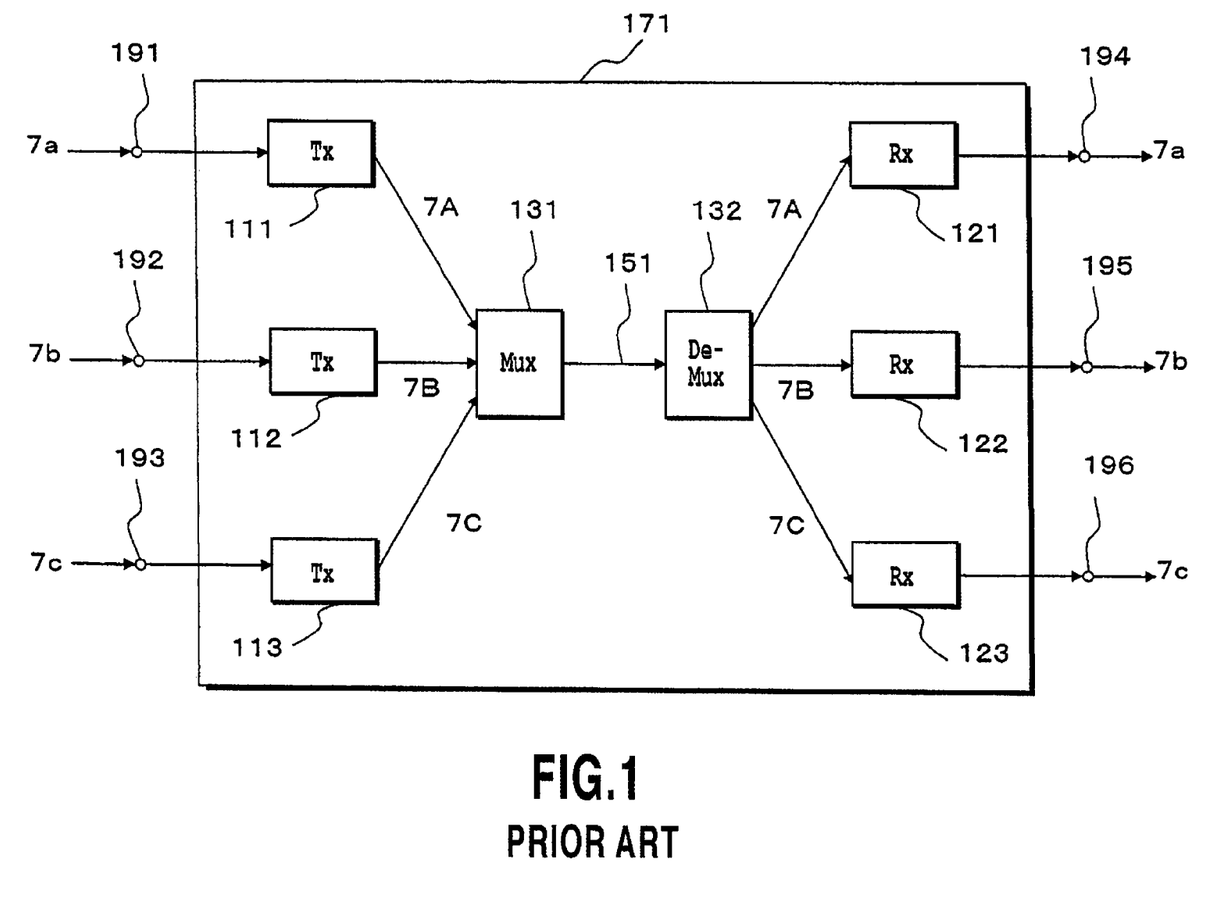
FIG. 1 is a block diagram showing prior-art configuration of a wavelength multiplex transmission system.

FIG. 1 shows an example of configuration of a typical wavelength multiplex transmission system (e.g. see non-patent literatures 1 to 8). This is an example where three wavelengths are wavelength-multiplexed. Three electrical signals 7a, 7b and 7c inputted from input terminals 191, 192 and 193, are converted to optical signals 7A, 7B and 7C with different wavelengths by optical transmitters 111, 112 and 113, respectively. These optical signals are wavelength-multiplexed by wavelength multiplex filter 131 and converted to one wavelength-multiplexed signal, which is transmitted via optical transmission line 151. The transmitted wavelength-multiplexed signal is separated by wavelength separation filter 132 to optical signals with their respective wavelengths, which are outputted from output terminals 194, 195 and 196 by optical receivers 121, 122 and 123, respectively.

In such wavelength multiplex transmission system 171, crosstalk between wavelengths can occur at optical transmission line 151 or wavelength separation filter 132. When crosstalk occurs, crosstalk components are superposed on the signal, and this can lead to deterioration of the optical signal (e.g. see non-patent literatures 1 to 7).

Figure 2:
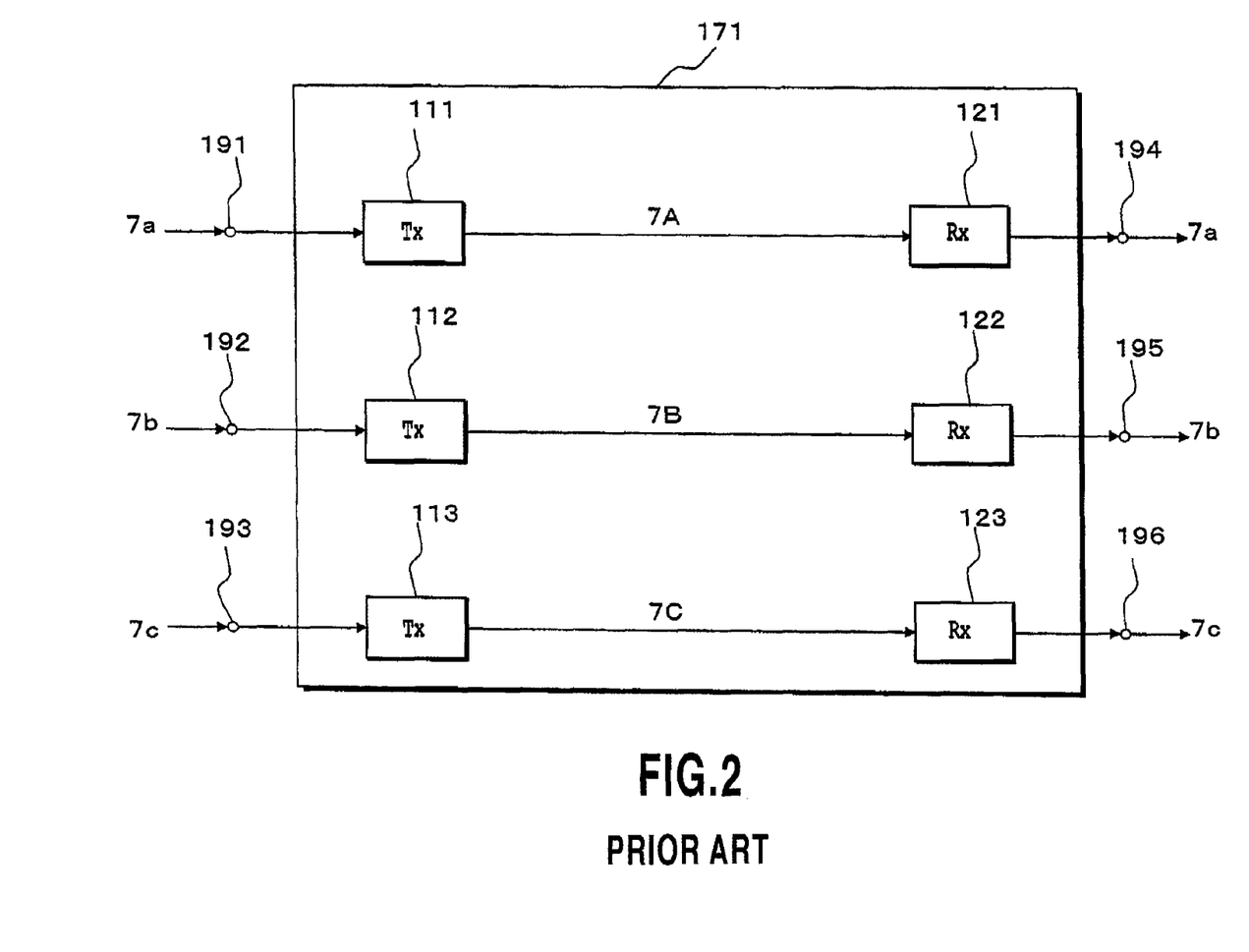
FIG. 2 is a schematic diagram illustrating flows of signals in a conventional wavelength multiplex transmission system.

As an example, FIG. 2 shows flows of signals when three wavelengths are wavelength-multiplexed. Signals 7a, 7b and 7c are electrical signals inputted into wavelength multiplex transmission system 171. These electrical signals are inputted from input terminals 191 into optical transmitter 111, inputted from input terminals 192 into optical transmitter 112, and inputted from input terminals 193 into optical transmitter 113, respectively. Optical signals 7A, 7B and 7C are outputted from the respective optical transmitters and transmitted. In transmission of the optical signals, if there is no crosstalk among wavelengths of optical signals 7A, 7B and 7C, then signals 7a, 7b and 7c are outputted from optical receivers 121, 122 and 123, respectively.

Figure 3:
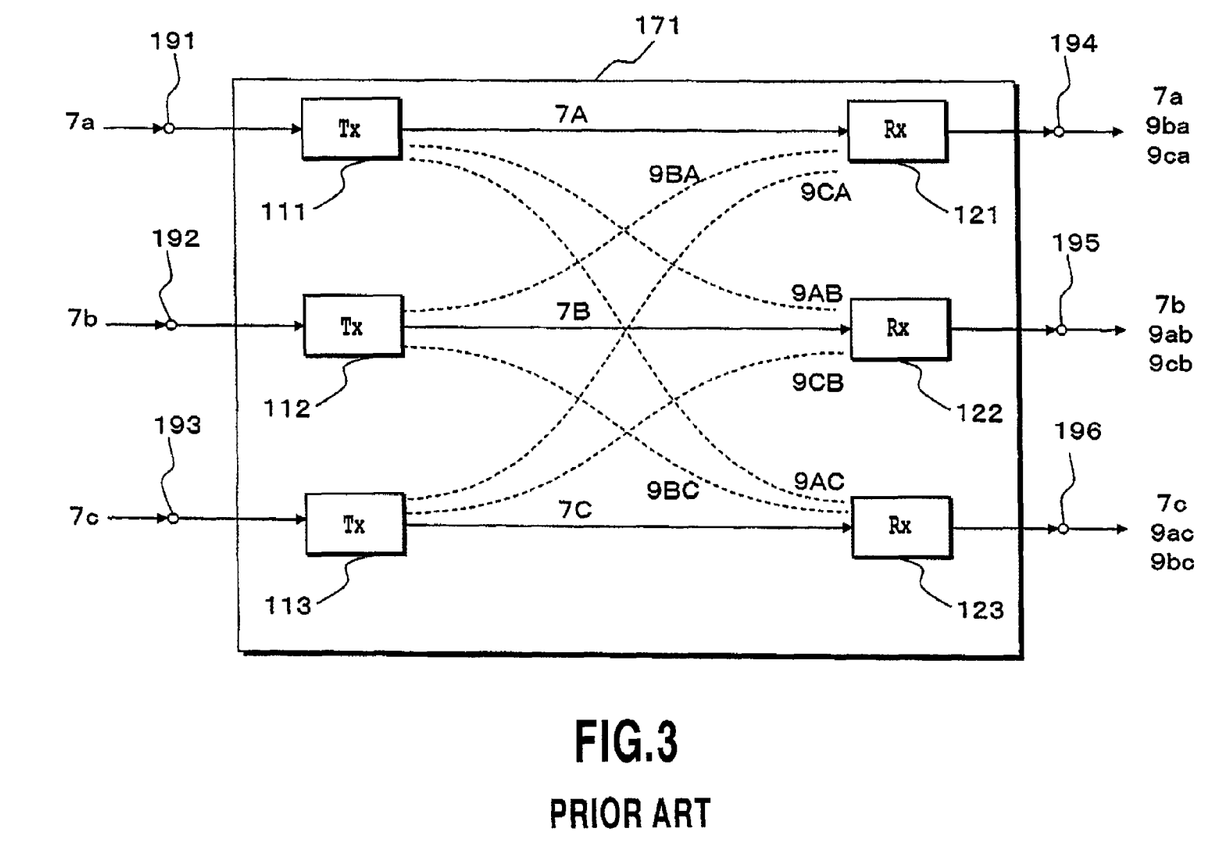
FIG. 3 is a schematic diagram illustrating flows of signals and crosstalk components in a conventional wavelength multiplex transmission system.

FIG. 3 shows flows of signals in a three-wavelength multiplexed transmission system when there is crosstalk in transmission of optical signals. Signals 7a, 7b and 7c are electrical signals inputted into wavelength multiplex transmission system 171. These electrical signals are inputted from input terminal 191 into optical transmitter 111, inputted from input terminal 192 into optical transmitter 112, and inputted from input terminal 193 into optical transmitter 113, respectively. Optical signals 7A, 7B and 7C are outputted from the respective optical transmitters and transmitted. When there is crosstalk among wavelengths of optical signals 7A, 7B and 7C, crosstalk components, in addition to electrical signals 7a, 7b and 7c, are outputted from optical receivers 121, 122 and 123, respectively. That is, from output terminal 194 of optical receiver 121, electrical-level crosstalk components 9ba and 9ca from optical signals 7B and 7C are outputted in addition to signal 7a. From output terminal 195 of optical receiver 122, electrical-level crosstalk components 9ab and 9cb from optical signals 7A and 7C are outputted in addition to signal 7b. From output terminals 196 of optical receiver 123, electrical-level crosstalk components 9ac and 9bc from optical signals 7A and 7B are outputted in addition to signal 7c. Here, reference symbols 9BA, 9CA, 9AB, 9CB, 9AC and 9BC in the figure denote optical crosstalk components.

Crosstalk among wavelengths can be caused by stimulated Raman scattering (SRS), cross phase modulation (XPM) and the like, which are due to nonlinearity of optical fiber constituting the optical transmission line (e.g. see non-patent literatures 2, 3, 5 and 7). Crosstalk among wavelengths can also be caused by poor wavelength separation characteristic of the wavelength separation filter, in addition to the nonlinearity of optical fiber (e.g. see non-patent literature 4).

As a method for reducing such crosstalk, crosstalk can be reduced by making polarization directions of adjacent optical signals orthogonal when multiplexing and transmitting over an optical transmission line (e.g. see patent literature 1). However, this method is effective only for adjacent wavelengths, and no effect of reducing crosstalk has been obtained for non-adjacent wavelengths.

[Patent Literature 1] Japanese Patent Application Laid-Open No. 08-18536

[Non-Patent Literature 1] K. Kikushima et al., "Signal crosstalk due to fiber nonlinearity in wavelength multiplex SCM-AM TV transmission systems," Optical Fiber Communication Conference (OFC '95), Post-deadline paper, PD24, February to March 1995

[Non-Patent Literature 2] A. Li et al., "Experimental confirmation of crosstalk due to stimulated Raman scattering in WDM AM-VSB transmission systems," Electronics Letters, vol. 31, No. 18, pp. 1538-1539, August 1995

[Non-Patent Literature 3] Takachio et al., "Review of 10 Gb/s 8CH WDM Transmission System in Arrangement of Wavelengths at Irregular Intervals," Technical Research Report of the Institute of Electronics, Information and Communication Engineers, CS96-43, pp. 19-24, June 1996

[Non-Patent Literature 4] K-P Ho et al., "Demultiplexer crosstalk rejection requirements for hybrid WDM system with analog and digital channels," IEEE Photonics Technology Letters, Vol. 10, No. 5, pp. 737-739, May 1998

[Non-Patent Literature 5] M. R. Phillips et al., "Crosstalk due to optical fiber nonlinearities in WDM CATV lightwave systems," IEEE Journal of Lightwave Technology, Vol. 17, No. 10, pp. 1782-1792, October 1999

[Non-Patent Literature 6] Shibata et al., "Optical Picture Delivery System With FM Batch Conversion Method," The Journal of the Institute of Electronics, Information and Communication Engineers, B, Vol. J. 83-B, No. 7, pp. 948-959, July 2000

[Non-Patent Literature 7] F. Coppimger et al., "Nonlinear Raman crosstalk in a video overlay passive optical networks," Optical Fiber Communication Conference (OFC 2003) TuR5, March 2003

[Non-Patent Literature 8] ITU-T Recommendation G. 983.3 "A broadband optical access system with increased service capability by wavelength allocation"

DISCLOSURE OF THE INVENTION

The present invention is directed to provide wavelength multiplex transmission systems capable of reducing crosstalk among wavelengths in wavelength multiplex transmission and reducing deterioration of optical signals, and transmission apparatuses and receiving apparatuses applied to such wavelength multiplex transmission systems.

In a wavelength multiplex transmission system according to the present invention, transmission apparatus differentially divide one input signal into two, each of which is converted to an optical signal, and wavelength-multiplexed for transmission. When crosstalk occurs in this wavelength multiplex transmission system, the crosstalk is superposed onto the two optical signals. This crosstalk will be equally superposed onto each of the signals with inverted polarities. Accordingly, by converting the optical signals to electrical signals and then differentially combining them at a receiving apparatus, their signal components will be accumulated, while their crosstalk components will be cancelled out. Thereby, it can realize a wavelength multiplex transmission system capable of reducing deterioration of optical signals due to crosstalk, and a transmission apparatus and a receiving apparatus thereof.

Specifically, a wavelength multiplex transmission system according to the present invention comprises a transmission apparatus and a receiving apparatus connected via an optical transmission line; wherein the transmission apparatus comprises (N+M) optical transmitters (where N is an integer of 2 or more and M is an integer between 1 and N) for transmitting input signals as optical signals with different wavelengths, M differential dividers for differentially dividing Minput signals out of the input signals, respectively and inputting the differentially divided signals into 2×M optical transmitters out of the (N+M) optical transmitters, respectively, and a wavelength multiplex filter for multiplexing and outputting the (N+M) optical signals from the (N+M) optical transmitters, and the receiving apparatus comprises; a wavelength separation filter for separating the wavelength-multiplexed optical signals to output (N+M) optical signals, (N+M) optical receivers for receiving the (N+M) optical signals from the wavelength separation filter, respectively, to output signals, and M differential combiners, each differentially combining the output signals from two optical receivers receiving a pair of optical signals that has differentially divided and transmitted, out of the (N+M) optical receivers, to output one signal.

For M signals to be differentially divided and transmitted out of N signals to be transmitted, the transmission apparatus converts 2×M electrical signals having their polarities inverted each other to optical signals together with the other (N−M) signals to transmit. Then, at the receiving apparatus, after the 2×M optical signals are each converted to electrical signals, for each pair of signals with inverted polarities, the signals are differentially combined to provide M signals. Crosstalk components are equally superposed on the signals outputted from the optical receivers, and the difference between the cross components is considered small. Therefore, by converting the optical signals to electrical signals and then differentially combining them at the receiving apparatus, their signal components are accumulated, while their cross talk components are cancelled out. Accordingly, a wavelength multiplex transmission system can be provided which reduces crosstalk occurred between a differential divider and a differential combiner, reducing deterioration of signals. Note that the optical receiver here is not the one that identifies temporal and amplitude scales from a received optical signal to re-construct the signal.

The transmission apparatus is characterized in that two corresponding signals from one differential divider are inputted into two optical transmitters, respectively, and transmitted as optical signals with adjacent wavelengths. Crosstalk arisen from nonlinearity of optical fiber used for an optical transmission line will have similar influence as the wavelengths of the two optical signals approach each other. Accordingly, by transmitting a pair of differentially divided signals as optical signals of adjacent wavelengths, it can make crosstalk components superposed on the signals outputted from optical receivers become similar. Thereby, a wavelength multiplex transmission system can be provided which effectively reduces crosstalk due to nonlinearity of optical fiber.

The receiving apparatus is characterized in that it further comprises a delay time controller for adjusting delay time difference between the pair of optical signals over the optical transmission line, at a preceding stage of the differential combiner. The delay time difference stems mainly from wavelength dispersion. The delay time controller adjusts difference in delay time for the pair of signals with inverted polarities outputted from the differential divider to arrive at the receiving apparatus. Thereby, the signals can be accumulated with temporal alignment of their signal components outputted from the optical receivers, so that even if the optical signals are deteriorated by wavelength dispersion, their crosstalk components can be cancelled out with differential combining and the signal can be effectively reproduced. Accordingly, a wavelength multiplex transmission system can be provided which reduces crosstalk and reduces deterioration of optical signals even in high-density wavelength multiplex transmission or broadband wavelength multiplex transmission where an optical signal is deteriorated due to wavelength dispersion.

A transmission apparatus according to the present invention comprises; (N+M) optical transmitters (where N is an integer of 2 or more and M is an integer between 1 and N) for transmitting input signals as optical signals with different wavelengths, M differential dividers for differentially dividing Minput signals out of the input signals, respectively, and inputting the differentially divided signals into 2×M optical transmitters out of the (N+M) optical transmitters, respectively, and a wavelength multiplex filter for multiplexing the (N+M) optical signals from the (N+M) optical transmitters to output.

For M signals to be differentially divided and transmitted out of N signals to be transmitted, the transmission apparatus converts 2×M electrical signals having their polarities inverted each other to optical signals together with the other (N−M) signals to transmit. When crosstalk occurs over the optical transmission line, after the 2×M signals are each converted to electrical signals at the receiving apparatus, for each pair of signals having inverted polarity one another, the signals are differentially combined to provide M signals. Crosstalk components are equally superposed on the signals outputted from the optical receivers, and the difference between the cross components is considered small. Therefore, by the receiving apparatus converting the optical signals to electrical signals and differentially combining them, their signal components are accumulated, while their cross talk components are cancelled out. Thereby, a transmission apparatus can be provided which reduces crosstalk occurred between a differential divider and a differential combiner, reducing deterioration of signals.

The transmission apparatus is characterized in that two corresponding signals from one differential divider are inputted into two optical transmitters, respectively, and transmitted as optical signals with adjacent wavelengths. Crosstalk due to nonlinearity of optical fiber used for the optical transmission will have similar influence as the wavelengths of the two optical signals approach each other. Accordingly, by transmitting a pair of differentially divided signals as optical signals of adjacent wavelengths, it can make crosstalk components superposed on the signals outputted from the optical receivers become similar. Thereby, as for the transmission apparatus, a transmission apparatus can be provided which effectively reduces crosstalk due to nonlinearity of optical fiber.

A receiving apparatus according to the present invention is characterized in that it comprises; a wavelength separation filter for separating a wavelength-multiplexed optical signal to output (N+M) optical signals (where N is an integer of 2 or more and M is an integer between 1 and N), (N+M) optical receivers for receiving the (N+M) optical signals from the wavelength separation filter, respectively, to output signals, and M differential combiners for differentially combining the output signals from two optical receivers receiving paired optical signals out of the (N+M) optical receivers, to output one signal.

At the receiving apparatus, when inputted with 2×M optical signals consisting of pairs of optical signals inverted in polarity, after the 2×M signals are each converted to electrical signals, for each pair of signals with inverted polarities, the signals are differentially combined to provide M signals. Crosstalk components are equally superposed on the signals outputted from the optical receivers, and the difference between the cross components is considered small. Therefore, by the receiving apparatus converting the optical signals to electrical signals and differentially combining them, their signal components are accumulated, while their crosstalk components are cancelled out. Thereby, crosstalk is reduced which has occurred from the transmission apparatus to the receiving apparatus, enabling the provision of a receiving apparatus which reduces deterioration of signals. Note that the optical receiver here is not the one that identifies temporal and amplitude scales from a received optical signal to re-construct the signal.

The receiving apparatus is characterized in that it further comprises a delay time controller for adjusting delay time difference between a pair of optical signals over the optical transmission line, at a preceding stage of the differential combiner. The delay time difference stems mainly from wavelength dispersion. The delay time controller adjusts difference in delay time for a pair of signals with inverted polarities outputted from the differential divider to arrive at the receiving apparatus. Thereby, the signals can be accumulated with temporal alignment of their signal components outputted from the optical receivers, so that even if the optical signals are deteriorated by wavelength dispersion during the wavelength multiplex transmission, their crosstalk components can be cancelled out with differential combining and the signal can be effectively reproduced. Accordingly, a wavelength multiplex transmission system can be provided which reduces crosstalk and reduces deterioration of optical signals even in high-density wavelength multiplex transmission or broadband wavelength multiplex transmission where an optical signal is deteriorated due to wavelength dispersion.

The present invention enables the provision of a wavelength multiplex transmission system capable of reducing crosstalk and reducing deterioration of signals by transmitting a pair of differentially divided signals at a transmission apparatus and differentially combining the pair of signals at a receiving apparatus, and a transmission apparatus and a receiving apparatus thereof.

DESCRIPTION OF SYMBOLS $1a$, $1a$-, $1b$, $1b$-, $1c$, $1c$-, $7a$, $7b$, $7c$ electrical signal
1A, 1A-, 1B, 1B-, 1C, 1C-, 7A, 7B, 7C optical signal
$4b$, $4c$ electrical-level crosstalk component
4B, 4C optical-level crosstalk component
$9ba$, $9ca$, $9ab$, $9cb$, $9ac$, $9bc$ electrical crosstalk component
9BA, 9CA, 9AB, 9CB, 9AC, 9BC optical crosstalk component
11, 12, 13, 14, 111, 112, 113 optical transmitter
21, 22, 23, 24, 121, 122, 123 optical receiver
31, 131 wavelength multiplex filter
32, 132 wavelength separation filter
41, 43, 45 differential divider
42, 44, 46 differential combiner
49 delay time controller
51, 151 optical transmission line
61, 65, 67 transmission apparatus
62, 64, 66, 68 receiving apparatus
71, 72, 73, 171 wavelength multiplex transmission system
91, 92, 93, 191, 192, 193 input terminal
94, 95, 96, 194, 195, 196 output terminal

BEST MODE FOR CARRYING OUT THE INVENTION

Embodiments will be described below with reference to the drawings.

Figure 4:
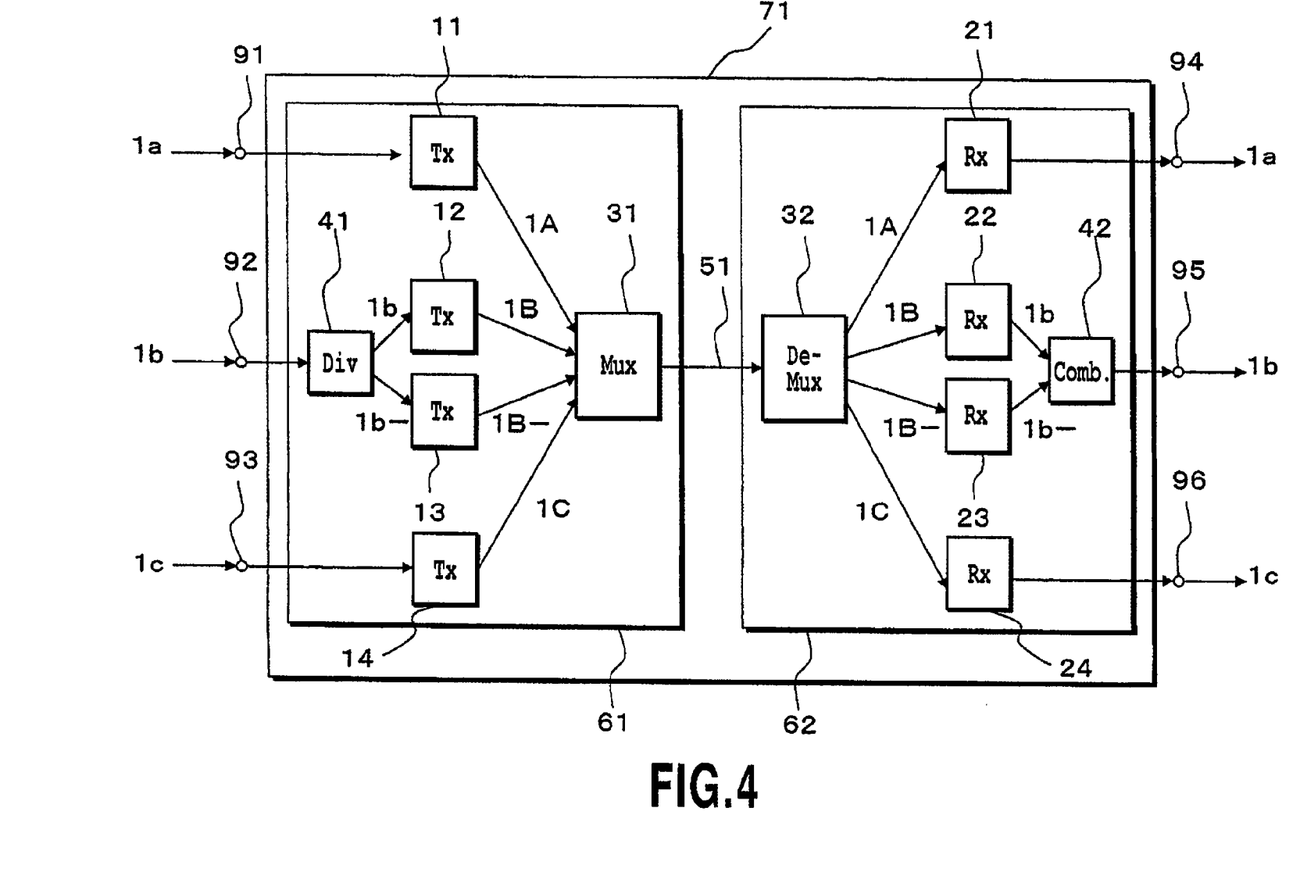
FIG. 4 is a block diagram showing configuration of an embodiment of a wavelength multiplex transmission system of the present invention.

An example of a wavelength multiplex transmission system will be described with the reference to FIG. 4. FIG. 4 illustrates an example of configuration of wavelength multiplex transmission system 71, where the number of signals N to be transmitted is 3, and the number of signals M for which crosstalk is to be reduced out of the signals to be transmitted is 1.

Wavelength multiplex transmission system 71 has transmission apparatus 61 and receiving apparatus 62 which are connected via optical transmission line 51. Transmission apparatus 61 is provided with four optical transmitters 11, 12, 13 and 14, one differential divider 41 and wavelength multiplex filter 31. Optical transmitters 11, 12, 13 and 14 transmit input signals as optical signals with different wavelengths. Differential divider 41 differentially divides one input signal $1b$ out of input signals $1a$, $1b$ and $1c$ into signal $1b$ and signal $1b$- with its polarity inverted, and inputs them to two optical transmitters 12 and 13, respectively, out of four optical transmitters 11, 12, 13 and 14. Wavelength multiplex filter 31 multiplexes the four optical signals from optical transmitters 11, 12, 13 and 14 to output.

Receiving apparatus 62 is provided with wavelength separation filter 32, four optical receivers 21, 22, 23 and 24, and one differential combiner 42. Wavelength separation filter 32 separates the wavelength-multiplexed optical signal and outputs four optical signals. Optical receivers 21, 22, 23 and 24 respectively receive the four optical signals from wavelength separation filter 32, and output them as electrical signals. Differential combiner 42 differentially combines signals 1b and 1b- from two optical receivers 22 and 23 receiving the paired optical signals which have been differentially divided and transmitted out of four optical receivers 21, 22, 23 and 24, and outputs one signal 1b.

Input terminals 91, 92 and 93 are input terminals provided for transmission apparatus 61, and input signals 1a, 1b and 1c to the wavelength multiplex transmission system are inputted to the respective input terminals. Differential divider 41 generates an inverted signal, having polarity of the inputted signal inverted, and outputs two signals, i.e. the input signal and the inverted signal. The differential divider 41 is the one that can generate differential signals, and may be part of circuits included in the transmission apparatus. The differential divider 41 may be the one that can vary amplitude of the output signal.

Optical transmitters 11, 12, 13 and 14 convert input signals to optical signals with different wavelengths, respectively. The wavelength to be outputted from each optical transmitter may be predetermined. Alternatively, the wavelength to be outputted from the optical transmitter may be externally set. By making the wavelength variable, the number of multiplexing wavelengths on optical transmission line 51 can be increased adding more optical transmitters or transmission apparatuses. The optical transmitter may be the one that is capable of polarization multiplexing, making polarization of the output optical signal variable.

Wavelength multiplex filter 31 multiplexes optical signals with multiple wavelengths and outputs as one optical signal. For wavelength multiplex filter 31, a conventional wavelength multiplex filter using means for bundling lights, such as a waveguide filter, a coupler or a prism, can be used. A wavelength multiplex filter applicable to polarization multiplexing may be used to achieve higher density in wavelength-multiplexed signal.

Optical transmission line 51 is placed between the transmission apparatus and the receiving apparatus and conveys an optical signal. Optical transmission line 51 is optical propagation means, such as optical fiber, a connector and a switch, which can convey wavelength-multiplexed signal. The optical propagation means may include optical signal compensation means such as a dispersion compensated fiber and an optical amplifier.

Wavelength separation filter 32 separates wavelength-multiplexed signal and outputs according to wavelengths. A conventionally used wavelength separation filter, such as a waveguide filter, a coupler and a prism, can be used as wavelength separation filter 32.

Optical receivers 21, 22, 23 and 24 convert optical signals to electrical signals. The optical receivers may be the one that can adjust amplitude of the output signal to predetermined amplitude, or may be the one that identifies temporal scale to make synchronization with a predetermined signal. However, the optical receiver is not the one that identifies temporal and amplitude scales from a received optical signal to re-construct the signal.

The differential combiner 42 combines a pair of signals that are differentially divided by the transmission apparatus. It is the one that can perform differential combining and may be part of circuits included in the receiving apparatus.

In FIG. 4, input signals 1a and 1c inputted from input terminals 91 and 93 are converted to optical signals 1A and 1C by optical transmitters 11 and 14, respectively, and outputted to wavelength multiplex filter 31. Input signal 1b inputted from input terminal 92 is converted by differential divider 41 to electrical signals 1b and 1b- having inverted polarities one another, and are each outputted from differential divider 41. Optical transmitter 12 converts electrical signal 1b outputted from differential divider 41 to optical signal 1B. Optical transmitter 13 converts electrical signal 1b- outputted from differential divider 41 to optical signal 1B-. Wavelength multiplex filter 31 multiplexes optical signals 1A, 1B, 1B- and 1C outputted from optical transmitters 11, 12, 13 and 14, and outputs the wavelength-multiplexed signal to optical transmission line 51.

As described above, in transmission apparatus 61, two signals 1b and 1b- with inverted polarities are generated by differential divider 41, and converted to optical signals 1B and 1B-, respectively, to be outputted to optical transmission line 51. On the other hand, in receiving apparatus 62, optical signals 1B and 1B- are separated by wavelength separation filter 32 and converted to electrical signals 1b and 1b- by optical receivers 22 and 23. On the signals outputted from optical receivers 22 and 23, crosstalk components are equally superposed and the difference between the crosstalk components is considered small. Therefore, by differentially combining these signals, their signal components are accumulated, while their crosstalk components are cancelled out. In this way, by adopting a differential divider in a transmission apparatus, a transmission apparatus can be provided which is capable of reducing crosstalk occurred between the differential divider and a differential combiner, reducing deterioration of signals.

Though, in this example, the number of signals to be transmitted N is 3, and the number of signals to be differentially divided and transmitted M is 1 out of the signals to be transmitted, N can be any integer of 2 or more, and M can be any integer between 1 and N. If N is 3 and M is 2, then the numbers of differential dividers and optical transmitters are to be increased by the increased number of M. As such, it is possible to provide differential dividers and differential combiners and reduce crosstalk only for wavelengths for which influence of crosstalk can be a problem among wavelength-multiplexed transmission signals.

Furthermore, when both N and M are 3, that is, N differential dividers and N differential combiners are placed for N input signals, crosstalk can be reduced for all the input signals.

Furthermore, a pair of signals with inverted polarities outputted from a differential divider may be transmitted using two optical signals having the same wavelengths but different polarization directions. Furthermore, the transmission apparatus may be further provided not only with the wavelength multiplexing function but also with a time multiplexing function. The number of wavelength multiplex filters is not limited to one. By providing multiple wavelength multiplex filters, it is possible to transmit wavelength-multiplexed signals with multiple places. The input terminals of the transmission apparatus are not limited to the ones adopted for electrical signals, and input terminals adopted for optical signals may be provided.

In transmission apparatus 61, two corresponding signals from a differential divider are inputted to two optical transmitters, respectively, and transmitted as optical signals preferably with adjacent wavelengths. That is, the wavelengths of optical signals outputted from optical transmitters 12 and 13 are wavelength-multiplexed with the adjacent wavelengths. Crosstalk arisen due to nonlinearity of optical fiber used for optical transmission line 51 will have similar influence as the wavelengths of the two optical signals approach each other. Accordingly, optical signals 1B and 1B-converted from the differentially divided pair of signals 1*b* and 1*b*- may be transmitted with adjacent wavelengths, so that crosstalk components superposed on signals outputted from optical receivers 22 and 23 can be similar. As a result, the crosstalk components included in signals 1*b* and 1*b*- can approach each other, and thereby reducing crosstalk due to nonlinearity of optical fiber effectively.

In FIG. 4, wavelength separation filter 32 separates a wavelength-multiplexed signal transmitted over optical transmission line 51 into optical signals 1A, 1B, 1B- and 1C according to their wavelengths. Optical receivers 21, 22, 23 and 24 converts optical signals 1A, 1B, 1B- and 1C separated according to the wavelengths to electrical signals 1*a*, 1*b*, 1*b*- and 1*c* to output. Differential combiner 42 differentially combines two signals 1*b* and 1*b*- from optical receivers 22 and 23 to output signal 1*b*. Output terminals 94, 95 and 96 are output terminals of receiving apparatus 62. Output signal 1*a* from optical receiver 21 is outputted from output terminal 94; output signal 1*b* from differential combiner 42 is outputted from output terminal 95; and output signal 1*c* from optical receiver 24 is outputted from output terminal 96.

As described above, receiving apparatus 62 differentially combines two signals 1*b* and 1*b*- outputted from optical receivers 22 and 23 by differential combiner 42. Crosstalk components are equally superposed on the signals outputted from optical receivers 22 and 23, and the difference between the cross components is considered small. Therefore, by converting optical signals 1B and 1B-to electrical signals 1*b* and 1*b*- and then differentially combining them at receiving apparatus 62, their signal components are accumulated, while their crosstalk components are cancelled out. Thereby, a receiving apparatus can be provide which is capable of reducing crosstalk occurred between a differential divider and a differential combiner, reducing deterioration of signals.

Optical receivers 22 and 23 do not have a function that discriminates temporal and amplitude scales of a signal component to re-reconstruct the signal. Means for detecting amplitude may be placed at the subsequent stage of optical receivers 22 and 23. By equalizing the amplitudes of signals 1*b* and 1*b*-, their crosstalk components can become more similar each other, and thereby reducing crosstalk effectively.

Though, in the example of FIG. 4, M is 1 and N is 3, N can be any integer of 2 or more, and M can be any integer between 1 and N. If N is 3 and M is 2, then the numbers of the optical receivers and the differential combiners are to be increased by the increased number of M. As such, it is possible to provide differential dividers and differential combiners and reduce crosstalk only for wavelengths for which influence of crosstalk can be a problem among the wavelength multiplexed transmission signals.

Furthermore, when both N and M are 3, that is, N differential dividers are provided for N signals, transmitting all the N signals to be transmitted as 2N signals with inverted polarities, which can reduce crosstalk for all the input signals.

The number of wavelength separation filters is not limited to one. By providing multiple wavelength separation filters, it is possible to receive optical signals from multiple places. Some of optical signals separated by the wavelength separation filters may be outputted from the receiving apparatus directly as optical signals. Furthermore, the receiving apparatus may be the one that can receive and separate a time-multiplexed signal.

Figure 6:
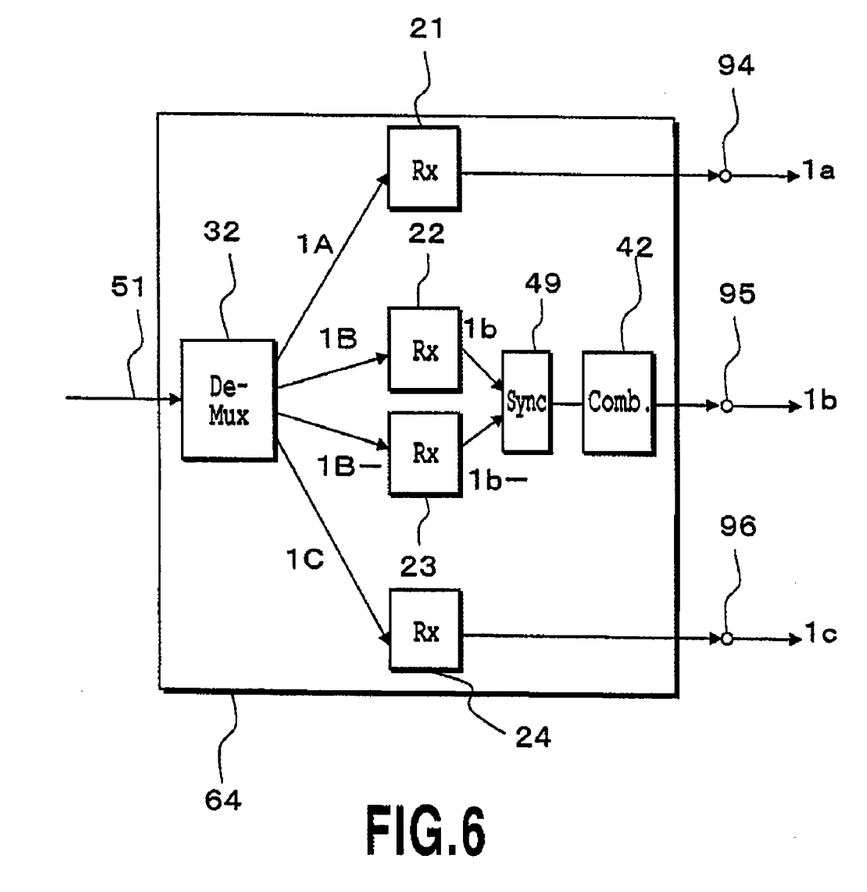
FIG. 6 illustrates another embodiment of a receiving apparatus of the present invention.

FIG. 6 shows another embodiment of a receiving apparatus. FIG. 6 illustrates configuration of another receiving apparatus. The difference between FIG. 4 and FIG. 6 is that delay time controller 49 for adjusting delay time difference between the paired optical signals over the optical transmission line is provided at the preceding stage of differential combiner 42 included in receiving apparatus 64. The delay time difference arisen mainly due to wavelength dispersion. The output terminals of optical receivers 22 and 23 are respectively connected to the input terminals of delay time controller 49, and the output terminal of delay time controller 49 is connected to differential combiner 42. Delay time controller 49 adjusts time delay difference between signals 1*b* and 1*b*- outputted from optical receivers 22 and 23, and outputs the signal to differential combiner 42. Thereby, signals 1*b* and 1*b*- differentially divided by differential divider 41 can be aligned in time to combine.

Accordingly, a receiving apparatus can be provided which is capable of reducing crosstalk due to wavelength dispersion occurred at optical transmission line 51, and reducing deterioration of signals.

Figure 5:
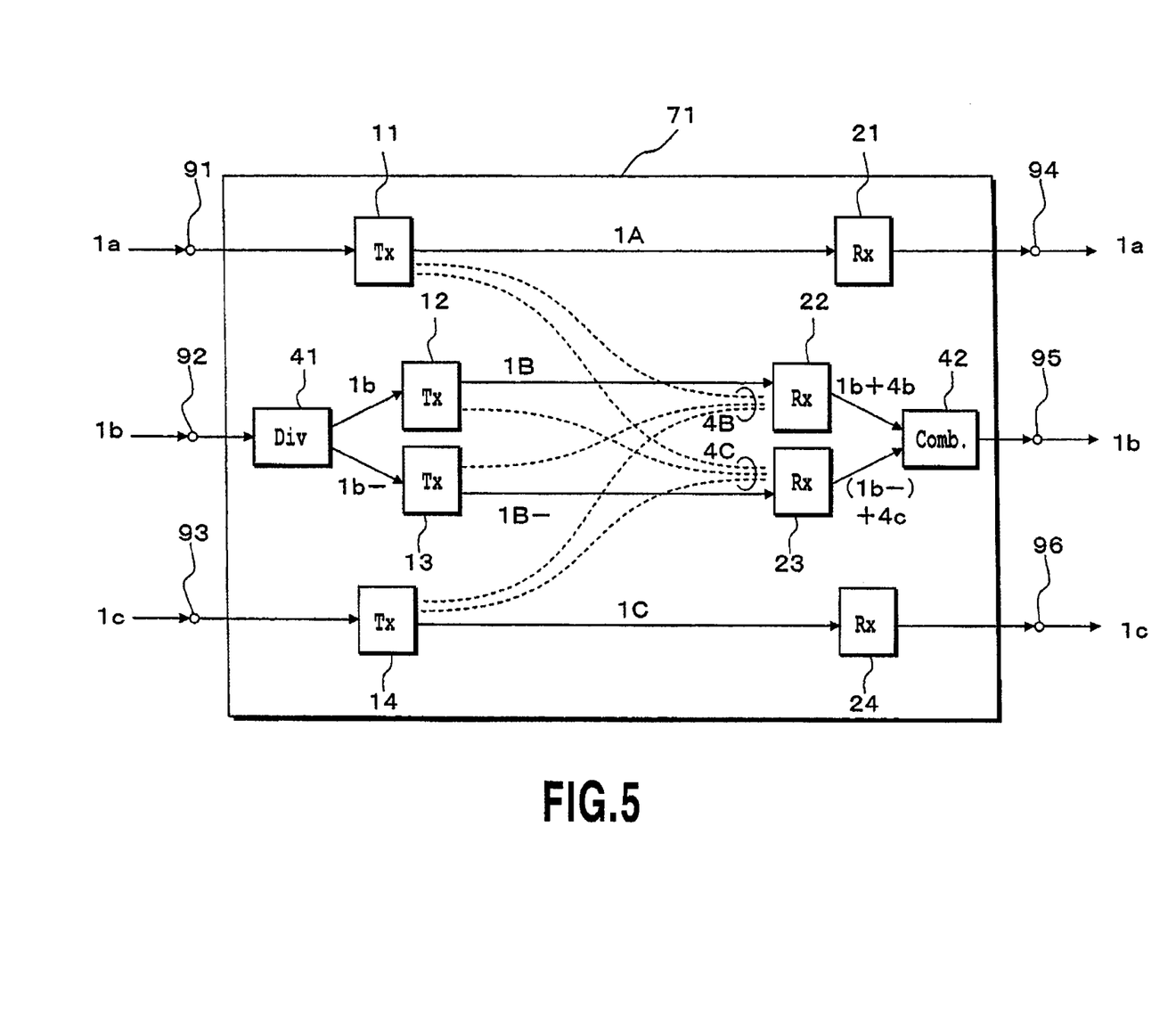
FIG. 5 illustrates flows of signal $1b$ and crosstalk components from signals $1a$ and $1c$ to signal $1b$ in an embodiment of wavelength multiplex transmission system of the present invention.

FIG. 5 schematically shows flows of signals 1*a*, 1*b* and 1*c* and crosstalk components when wavelength multiplex transmission system 71 shown in FIG. 4 is used. FIG. 5 shows crosstalk components in view of signal 1*b*. Input signal 1*a* inputted from input terminals 91 is converted to optical signal 1A and then transmitted by optical transmitter 11, and is then received and converted from optical signal 1A to electrical signal 1*a* by optical receiver 21, and is outputted from output terminals 94. Input signal 1*c* inputted from input terminals 93 is converted to optical signal 1C and transmitted by optical transmitter 14, and is then received and converted from optical signal 1C to electrical signal 1*c* by optical receiver 24, and is then outputted from output terminals 96. Input signal 1*b* inputted from input terminals 92 is inputted into differential divider 41, and differential divider 41 outputs signal 1*b* and signal 1*b*- of which polarity is inverted from signal 1*b*. Signal 1*b* outputted from differential divider 41 is converted to optical signal 1B and transmitted by optical transmitter 12, and then received and converted to electrical signal 1*b* by optical receiver 22. Other electrical signal 1*b*- outputted from differential divider 41 is converted to optical signal 1B- and transmitted by optical transmitter 13, and then received and converted to electrical signal 1*b*- by optical receiver 23. Signals 1*b* and 1*b*- outputted from optical receivers 22 and 23, respectively, are differentially combined by differential combiner 42, and output signal 1*b* is outputted from output terminals 95.

In each optical receiver 21, 22, 23, 24, a signal having crosstalk components in addition to the optical signal superposed is received, as shown in FIG. 5. To optical receiver 22, in addition to signal 1B, optical-level crosstalk component 4B due to optical signal 1A, 1B- and 1C is inputted, and crosstalk component 4B is converted to electrical signal 4*b*. Furthermore, to optical receiver 23, in addition to optical signal 1B-, optical-level crosstalk component 4C due to optical signal 1A, 1B and 1C is inputted, and crosstalk component 4C is converted to electrical signal 4*c*. As a result, signal 1*b* and crosstalk component 4*b* are outputted from optical receiver 22, and signal 1b- and crosstalk component 4c are outputted from optical receiver 23. For simplicity, crosstalk components from optical signals 1A, 1B and 1B- to optical signal 1C as well as from optical 1B, 1B- and 1C to optical signal 1A are omitted.

As such, leakage from each signal is a crosstalk. Therefore, optical-level crosstalk component 4B superposed on signal 1B and crosstalk component 4C superposed on optical signal 1B- have similar characteristics. Accordingly, when signal 1b and crosstalk component 4b, and signal 1b and crosstalk component 4c are differentially combined by differential combiner 42, then crosstalk components 4b and 4c are mostly cancelled out, while signals 1b and the 1b- are accumulated. Since the cancellation of the crosstalk components is carried out at the subsequent stage of optical receivers 22 and 23, crosstalk can be reduced which have occurred at the wavelength multiplex filter, the optical transmission line and the wavelength separation filter. Thereby, crosstalk can be reduced among wavelengths in the wavelength multiplex transmission system, and reducing deterioration of signals. Though description has been made with N as 3 and M as 1 here, N can be any integer of 2 or more, and M can be any integer between 1 and N.

Figure 7:
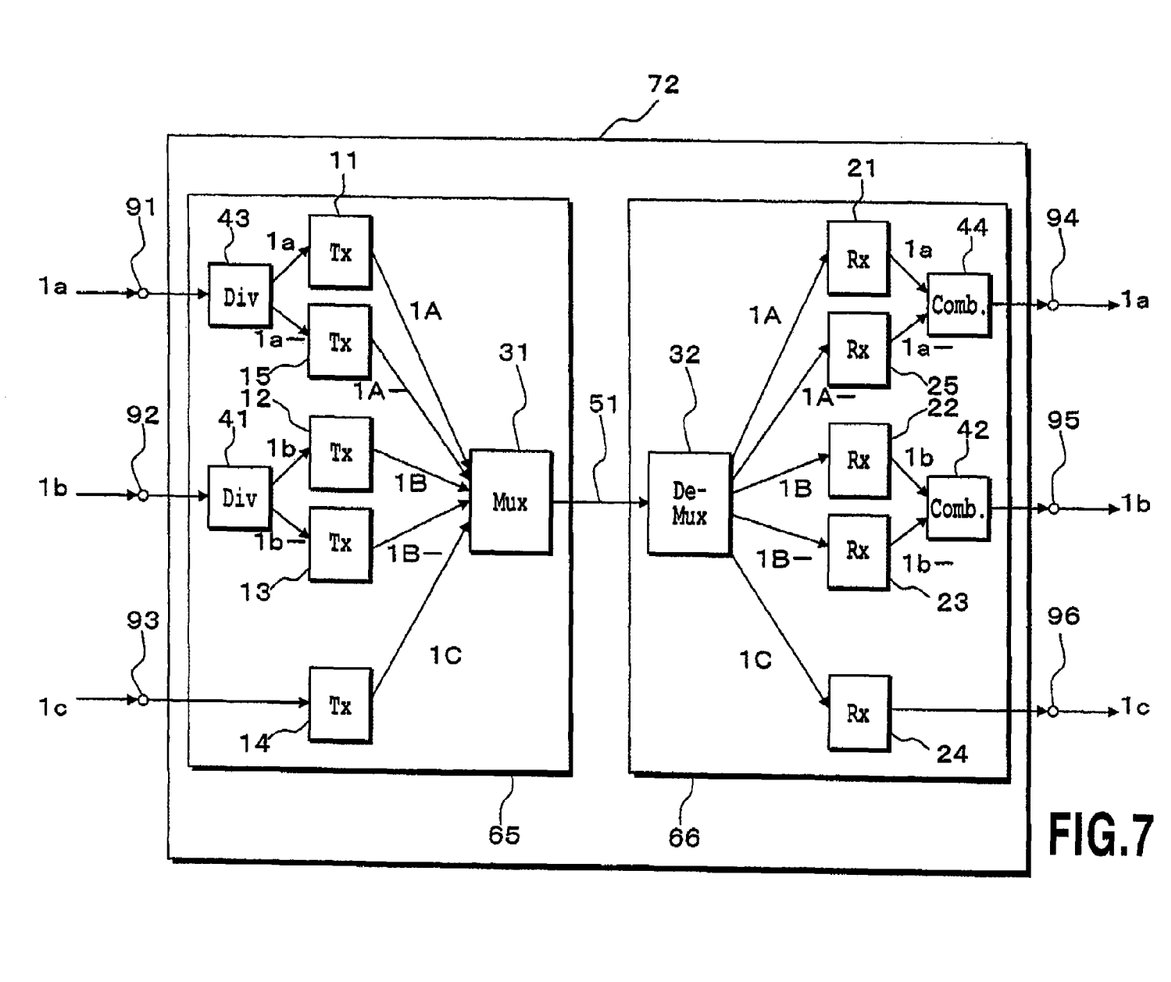
FIG. 7 shows configuration of another embodiment of wavelength multiplex transmission system of the present invention.

Description will now be made on an example of a wavelength multiplex transmission system when N is 3 and M is 2, with reference to FIG. 7. FIG. 7 illustrates an example of configuration of wavelength multiplex transmission system 72 which differentially divides and transmits input signal 1a in wavelength multiplex transmission system 71 shown in FIG. 4. Wavelength multiplex transmission system 72 comprises transmission apparatus 65 and receiving apparatus 66 connected via optical transmission line 51. In transmission apparatus 65, differential divider 43 and optical transmitter 15 are placed in addition to the components of the transmission apparatus shown in FIG. 4. Furthermore, in receiving apparatus 66, optical receiver 25 and differential combiner 44 are placed in addition to the components of the receiving apparatus shown in FIG. 4. Wavelength multiplex transmission system 72 is configured to reduce crosstalk of input signal 1a in addition to that of input signal 1b.

The flow of input signal 1a in wavelength multiplex transmission system 72 will be described. Input signal 1a inputted from input terminals 91 is inputted to differential divider 43. Differential divider 43 differentially divides signal 1a and outputs signal 1a and signal 1a- of which polarity is inverted from signal 1a. Signal 1a outputted from differential divider 43 is converted to optical signal 1A and transmitted to wavelength multiplex filter 31, by optical transmitter 11. Signal 1a- outputted from differential divider 43 is converted to optical signal 1A- and outputted to wavelength multiplex filter 31, by optical transmitter 15. Wavelength multiplex filter 31 multiplexes optical signals 1A, 1A-, 1B, 1B- and 1C, and outputs it to optical transmission line 51. Then, the wavelength multiplexed signal inputted into optical transmission line 51 is received by receiving apparatus 66 and separated according to wavelengths by wavelength separation filter 32. Optical signal 1A out of the signals is received by optical receiver 21 and converted to electrical signal 1a. Optical signal 1A- separated by wavelength separation filter 32 is received by optical receiver 25 and converted to electrical signal 1a-. Signals 1a and 1a- outputted from optical receivers 21 and 25 are differentially combined by differential combiner 44. Signal 1a differentially combined by differential combiner 44 is outputted from output terminals 94 of the receiving apparatus.

In wavelength multiplex transmission system 72, input signals 1a and 1b are differentially divided, and signals 1a- and 1b- with inverted polarities are, together with signals 1a and 1b, converted to optical signals and transmitted. Crosstalk components are equally superposed on each of signals outputted from the optical receivers, and therefore, the difference between the crosstalk components is considered small. Therefore, by differentially combining signals 1a and 1a-, and signals 1b and 1b- at receiving apparatus 66, the signal components are accumulated, while the crosstalk components are cancelled out, for each of signals 1a and 1b. Since the cancellation of the crosstalk components is carried out at the subsequent stage of optical receivers 21, 25, 22 and 23, crosstalk of input signals 1a and 1b can be reduced which have occurred at the wavelength multiplex filter, the optical transmission line and the wavelength separation filter. As such, it is possible to reduce crosstalk among wavelengths in the wavelength multiplex transmission system and reduce deterioration of signals only for wavelengths for which influence of crosstalk can be a problem among the wavelength multiplex transmission signals.

Figure 8:
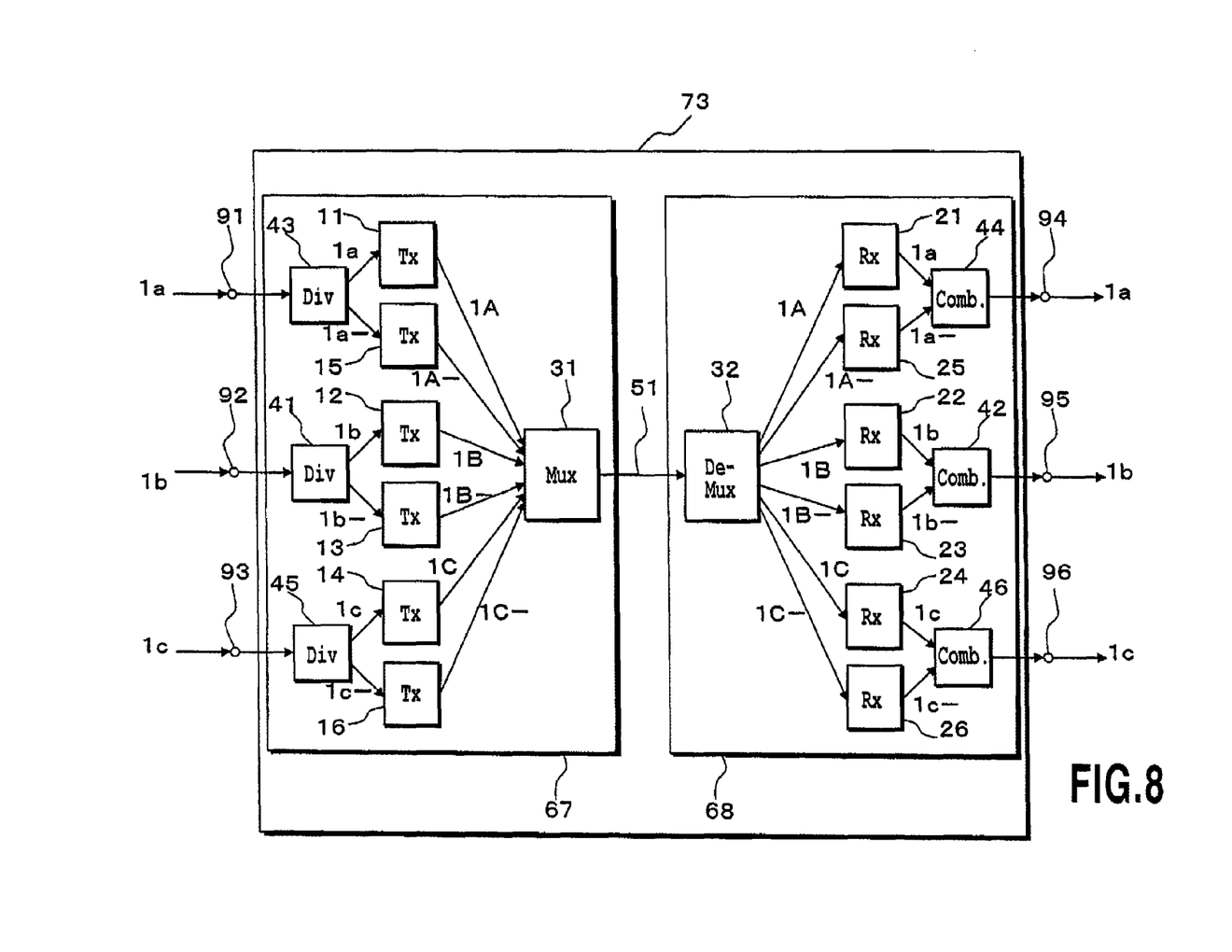
FIG. 8 shows configuration of another embodiment of wavelength multiplex transmission system of the present invention.

Description will now be made on an example of a wavelength multiplex transmission system when N is 3 and M is 3, with reference to FIG. 8. FIG. 8 illustrates an example of configuration of wavelength multiplex transmission system 73 which differentially divides and transmits input signal 1c as well as input signals 1a and 1b in wavelength multiplex transmission system 72 shown in FIG. 7. Wavelength multiplex transmission system 73 comprises transmission apparatus 67 and receiving apparatus 68 connected via optical transmission line 51. In transmission apparatus 67, differential divider 45 and optical transmitter 16 are placed in addition to the components in the transmission apparatus shown in FIG. 7. In receiving apparatus 68, optical transmitter 26 and differential combiner 46 are placed in addition to the components of the receiving apparatus shown in FIG. 7.

The flow of input signal 1c of wavelength multiplex transmission system 73 will be described. Input signal 1c inputted from input terminals 93 is inputted to differential divider 45. Differential divider 45 outputs signal 1c and signal 1c- of which polarity is inverted from that of signal 1c. Signal 1c outputted from differential divider 45 is converted to optical signal 1C by optical transmitter 14 and outputted to wavelength multiplex filter 31. Signal 1c- outputted from differential divider 45 is converted to optical signal 1C- by optical transmitter 16 and outputted to wavelength multiplex filter 31. Wavelength multiplex filter 31 multiplexes optical signals 1A, 1A-, 1B, 1B-, 1C and 1C-, and outputs it to optical transmission line 51. Then the wavelength multiplexed signal transmitted over optical transmission line 51 is received by receiving apparatus 68, and separated by wavelength separation filter 32 according to wavelengths. Optical signal 1C out of the signals is received by optical receiver 24 and converted to electrical signal 1c. Optical signal 1C- separated by wavelength separation filter 32 is received by optical transmitter 26 and converted to electrical signal 1c-. Signals 1c and 1c- outputted from optical receivers 24 and 26 are differentially combined by differential combiner 46. Signal 1c differentially combined by differential combiner 46 is outputted from output terminal 96 of the receiving apparatus.

In wavelength multiplex transmission system 73, all input signal are differentially divided, converted to optical signals, transmitted, and then differentially combined by the receiving apparatus. Crosstalk components are equally superposed on the signals outputted from the optical transmitters, and therefore, the difference between the crosstalk components is considered small. Therefore, by differentially combining signals 1a and 1a-, signals 1b and 1b-, and signals 1c and 1c- at receiving apparatus 68 after converting all the optical signals to electrical signals, their signal components are accumulated, while their crosstalk components are cancelled out. Since the differential combining is carried out at the subsequent stage of the optical receiver, crosstalk can be reduced which have occurred at the wavelength multiplex filter, the optical transmission line and the wavelength separation filter. As such, it is possible to reduce crosstalk among wavelengths in the wavelength multiplex transmission system and reduce deterioration of signals. In this way, if N and M are equal, using N differential dividers and N differential combiners for N input signals, crosstalk can be reduced for all the input signals.

The wavelength multiplex transmission systems 71, 72 and 73 may be provided with a polarization multiplex filter and a polarization separation filter so that it transmits a pair of signals with inverted polarities outputted from the differential divider, using two optical signals having the same wavelengths but different polarization directions. Furthermore, they may be provided not only with the wavelength multiplexing function but also with a time multiplexing function. The number of the wavelength multiplex filters and the number of the wavelength separation filters are not limited to one. Provided with multiple filters of such, communications can be realized via wavelength-multiplexed signals with multiple places. The input terminals to the transmission apparatus and the output terminals from the receiving apparatus may be the one that are used for transmitting optical signals.

INDUSTRIAL APPLICABILITY

The present invention is applicable not only a one-way wavelength multiplex transmission system but also a two-way wavelength multiplex transmission system in which multiple optical signals are wavelength multiplexed in one way. In this case, not only far end crosstalk but also near end crosstalk can be reduced.

The invention claimed is:

1. A wavelength multiplex transmission system having a transmission apparatus and a receiving apparatus connected via an optical transmission line to transmit an input signal, wherein:
   the transmission apparatus is configured to convert differential signals of the input signal to separate optical signals to transmit to the optical transmission line; and
   the receiving apparatus is configured to receive the separate optical signals from the optical transmission line to reproduce the differential signals and further configured to adjust a time difference between the reproduced differential signals.

2. The wavelength multiplex transmission system according to claim 1, wherein the receiving apparatus further combines the reproduced differential signals to reproduce the input signal.

3. A wavelength multiplex transmission system having a transmission apparatus and a receiving apparatus connected via an optical transmission line, wherein:
   the transmission apparatus comprises:
      (N+M) optical transmitters (where N is an integer of 2 or more and M is an integer from 1 to N) for transmitting a plurality of input signals as optical signals with different wavelengths,
      M differential dividers for differentially dividing M input signals out of the plurality of input signals, respectively, and inputting the differentially divided signals into 2×M optical transmitters out of the (N+M) optical transmitters, respectively, and
      a wavelength multiplex filter for wavelength multiplexing and outputting the (N+M) optical signals from the (N+M) optical transmitters, and wherein: the receiving apparatus comprises:
      a wavelength separation filter for separating the wavelength multiplexed optical signals to output (N+M) optical signals;
      (N+M) optical receivers for receiving the (N+M) optical signals from the wavelength separation filter, respectively, to output (N+M) output signals;
      M differential combiners, each differentially combining the output signals from the two optical receivers receiving a pair of optical signals which have been differentially divided and transmitted, out of the (N+M) optical receivers, to output one signal; and
      a delay time controller for adjusting delay time difference between a pair of optical signals on the optical transmission line, at the preceding stage of the differential combiner.

4. The wavelength multiplex transmission system according to claim 3, wherein the transmission apparatus has two corresponding differential signals from one differential divider as inputs to two optical transmitters, respectively, and transmits the two differential signals as separate optical signals with adjacent wavelengths.

5. A receiving apparatus for receiving optical signals including differential signals of a signal, comprising:
   optical receiving means for receiving the optical signals;
   optical conversion means for reproducing the differential signals from the optical signals;
   differential combining means for combining the reproduced differential signals; and
   time difference control means for adjusting time difference between the reproduced differential signals.

6. The receiving apparatus according to claim 5, wherein:
   the differential signals are wavelength-multiplexed as separate optical signals with different wavelengths; and
   the optical conversion means reproduces the differential signals from the separate optical signals.

7. A receiving apparatus comprising:
   a wavelength separation filter for separating a wavelength multiplexed optical signal to output (N+M) optical signals (where N is an integer of 2 or more and M is an integer from 1 to N);
   (N+M) optical receivers for receiving the (N+M) optical signals from the wavelength separation filter, respectively, to output (N+M) output signals;
   M differential combiners, each differentially combining the output signals from two optical receivers receiving a pair of optical signals out of the (N+M) optical receivers, to output one signal; and
   a delay time controller for adjusting delay time difference between the pair of two optical signals on the optical transmission line, at the preceding stage of the differential combiner.

* * * * *